United States Patent [19]
Pister

[11] Patent Number: 5,726,480
[45] Date of Patent: Mar. 10, 1998

[54] ETCHANTS FOR USE IN MICROMACHINING OF CMOS MICROACCELEROMETERS AND MICROELECTROMECHANICAL DEVICES AND METHOD OF MAKING THE SAME

[75] Inventor: Kristofer S. J. Pister, Pacific Palisades, Calif.

[73] Assignee: The Regents of the University of California, Oakland, Calif.

[21] Appl. No.: 379,751

[22] Filed: Jan. 27, 1995

[51] Int. Cl.$^6$ .................... H01L 29/72; H01L 29/76
[52] U.S. Cl. .................... 257/415; 257/417; 257/421; 257/522; 257/618; 257/735; 257/773; 437/228; 437/901; 437/921
[58] Field of Search .................... 257/415, 421, 257/522, 618, 735, 773; 437/228, 901, 921

[56] References Cited

U.S. PATENT DOCUMENTS

| | | |
|---|---|---|
| 4,487,677 | 12/1984 | Chen et al. |
| 4,765,865 | 8/1988 | Gealer et al. |
| 4,893,509 | 1/1990 | MacIver et al. |
| 4,930,043 | 5/1990 | Wiegand |
| 4,945,773 | 8/1990 | Sickafus |
| 5,126,812 | 6/1992 | Greiff |
| 5,151,763 | 9/1992 | Marek et al. |
| 5,221,400 | 6/1993 | Staller et al. |
| 5,233,874 | 8/1993 | Putty et al. .................... 257/415 |
| 5,313,835 | 5/1994 | Dunn |
| 5,354,416 | 10/1994 | Okudaira et al. |
| 5,357,803 | 10/1994 | Lane |
| 5,534,107 | 7/1996 | Gray et al. |

OTHER PUBLICATIONS

"Microelectromechanical Systems," by Mehran Mehregany, Circuits and Devices, Jul. 1993, pp. 14–22; 8755–3996/93/1993 IEEE.

"A CMOS Compatible Thermally Excited Silicon Oxide Beam Resonator with Aluminum Mirror," by D. Moser et al., Swiss Federal Institute of Technology, Zurich, Switzerland, 91CH2817-5/91/ 1991 IEEE, pp. 547–550.

(List continued on next page.)

*Primary Examiner*—Edward Wojciechowicz
*Attorney, Agent, or Firm*—Daniel L. Dawes

[57] ABSTRACT

What is described in the present specification are accelerometers using tiny proof masses and piezoresistive force detection. Conventional wisdom would indicate that this approach would not yield useful sensors. However, in fact, according to the invention, such devices are suitable in a wide range of applications. The devices may include deformable hinges to allow the fabrication of three dimensional structures. A new system has been developed which etches silicon highly selectively at moderate temperatures and without hydrodynamic forces potentially damaging to small structures and features. The system is based on the use of the gas phase etchant xenon diflouride, which is an unremarkable white solid at standard temperature and pressure.

49 Claims, 5 Drawing Sheets

OTHER PUBLICATIONS

"2 Thermoelectric Microsensors and Microsystems," by Henry Baltes et al., Swiss Federal Institute of Technology (ETH), Zurich, Switzerland.

"A Smart Accelerometer with on–chip electronics fabricated by a commercial CMOS process," Riethmuller et al., Sensors & Actuators A, 31 (1992) 121–124.

J. Marshall et al, "Realizing Suspended Structures on Chips Fabricated by CMOS Foundry Processes Through MOSIS Service," NISTIR 5402, U.S. National Institute of Standards and Technology, Gaithersburg, Maryland 20899 (1994).

M. Parameswaran et al., "Commercial CMOS Fabricated Integrated Dynamic Thermal Scene Simulator," IEEE Int. Elec. Dev. Mtg., San Francisco, CA Dec. 13–16, 1991, at 753–56.

M. Gaitan et al., "Performance of Commercial CMOS Foundry Compatible Multijunction Thermal Converters," in Proc. 7th Int. Conf. on Solid State Sensor and Actuators (Transducers '93) Yokohama, Jun. 7–10, 1993 at 1012–14.

Parameswaran et al., "CMOS Electrothermal Microactuator," in Proc. IEEE Microelectro Mechanical Systems Workshop, Napa, California, Feb. 11–14, 1990 at 128–31.

D. Moser, "CMOS Flow Sensors," Ph.D. Thesis ETH Zurich, Physical Electronics Laboratory, Swiss Federal Institute of Technology, Zurich, Switzerland.

Boltshauser et al., "Piezoresistive Membrane Hygrometers Based on IC Technology," Sensors & Materials, 5(3): 125–34 (1993).

H. Baltes, "CMOS as a Sensor Technology," Sensors and Actuators A37–38:51–6 (1993).

Parpia et al., "Modeling with CMOS Compatible High Voltage Device Structures," Proc. Symp. High Voltage and Smart Power Devices at 41–50 (1987).

Krummenacher et al., "Smart Temperature Sensor in CMOS Technology," Sensors and Actuators, A21–23:636:38 1990.

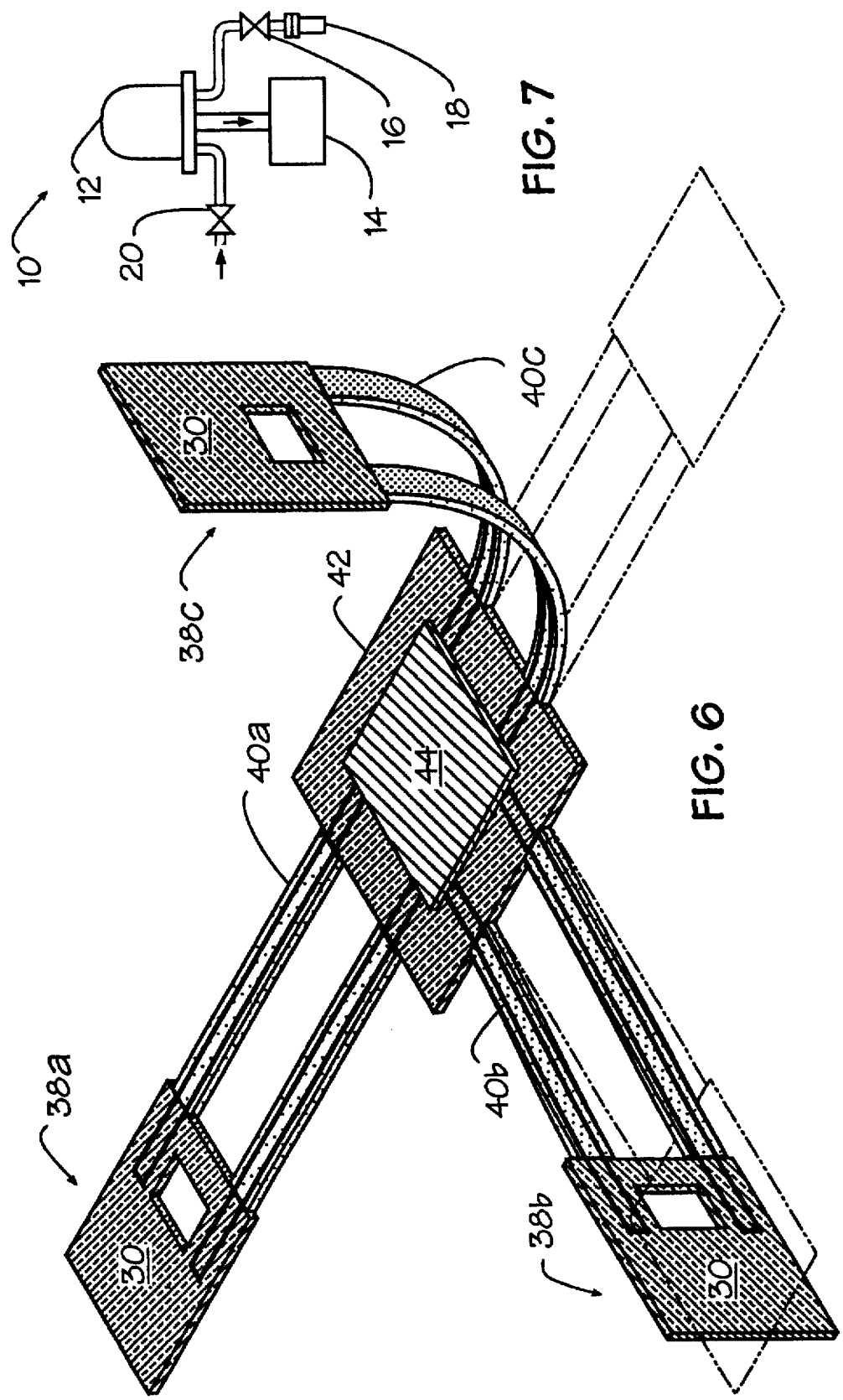

ETCHANTS FOR USE IN MICROMACHINING OF CMOS MICROACCELEROMETERS AND MICROELECTROMECHANICAL DEVICES AND METHOD OF MAKING THE SAME

BACKGROUND OF THE INVENTION

1. Field of the Invention

The invention relates to the field of three-dimensional microstructures, and in particular, to accelerometers compatible with CMOS technology.

2. Description of the Prior Art

The marriage of semiconductor fabrication technology with electromechanical microstructures has given rise to the theoretical possibility of a vast array of microsensors, microtransducers and microactuators that can potentially be made in large numbers at low cost to perform a wide variety of functions, particularly when integrally combined with integrated circuits.

However, the development of an application in micro electromechanical systems (MEMS) is often restricted by process-related barriers. Even conceptual designs can take a substantial amount of process development time. The development of a design for a device is typically coupled to process parameters, so that the process designer and the application designer must be in close communication, if not in fact, be the same person.

This is sharply contrasted with the state of integrated circuit design, in which it is possible to design good circuits without expert knowledge of the fabrication processes. Integrated circuit fabrication has produced scaleable CMOS design rules so that digital circuits can be designed and fabricated using standardized design assumptions and so that the design can be translated and used with substantially different design rules and hence device parameters.

Several research groups in Europe and North America have demonstrated that it is possible to micromachine commercial CMOS wafers using maskless post processing. This is done by stacking an active area, both metal contact cuts, and over-glass cuts, to leave bare silicon exposed when the chips are returned from the foundry. See for example J. Marshall et al., *"Realizing Suspended Structures on Chips Fabricated by CMOS Foundry Processes Through MOSIS Service,"* NISTIR 5402, U.S. National Institute of Standards and Technology, Gaithersburg, Md. 20899 (1994). The chips are then etched in EDP or some other anisotropic etchant. This technique was demonstrated in the late 1980's and has been used to produce a variety of micromachined components, including: infrared emitting arrays for thermal scene simulation, M. Parameswaran et al., *"Commercial CMOS Fabricated Integrated Dynamic Thermal Scene Simulator,"* IEEE Int. Elec. Dev. Mtg., San Francisco, Calif., Dec. 13–16, 1991, at 753-56; thermopile converters, M. Gaitan et al., *"Performance of Commercial CMOS Foundry Compatible Multijunction Thermal Converters,"* in Proc. 7th Int. Conf. on Solid State Sensors and Actuators (Transducers '93) Yokohama, Jun. 7-10, 1993, at 1012-14; thermal actuators, M. Parameswaran et al., *"CMOS Electrothermal Microactuator,"* in Proc. IEEE Microelectro Mechanical Systems Workshop, Napa, Calif., Feb. 11-14, 1990, at 128-31, flow sensors, D. Moser, *"CMOS Flow Sensors,"* Ph.D. Thesis ETH Zurich, Physical Electronics Laboratory, Swiss Federal Institute of Technology, Zurich, Switzerland, and resonant hygrometers, T. Boltshauser et al., *"Piezoresistive Membrane Hygrometers Based on IC Technology,"* Sensors and Materials, 5(3): 125–34 (1993) and H. Baltes, *"CMOS as a Sensor Technology,"* Sensors and Actuators A37-38:51-6 (1993).

Additionally, CMOS foundry has been used to make high voltage devices, Z. Parpia et al., *"Modeling with CMOS Compatible High Voltage Device Structures,"* in Proc. Symp. High Voltage and Smart Power Devices at 41–50 (1987), Absolute Temperature Sensors, P. Krummenacher et al., *"Smart Temperature Sensor in CMOS Technology,"* Sensors and Actuators, A21-23:636-38 (1990), Invisible Light Imaging Arrays. This impressive list of sensors and actuators comes packaged along with all the analog and digital electronics available in the foundry process. Nevertheless, two limitations of this approach has been the constraints imposed by etching and limited structural components.

Therefore, what is needed is a micromachining process useful in a wide variety of applications and devices, including but not limited to accelerometers, that will allow engineers and scientists from many different disciplines to create new micro electromechancial systems and applications, particularly using post process foundry CMOS wafers.

BRIEF SUMMARY OF THE INVENTION

The invention is an improvement in a method for fabricating microelectromechanical (MEM) devices. The improvement comprises the steps of providing a substantially completed MEM device except for the need of at least one unmasked etch to complete the device. The MEM device is etched with a generally isotropic etchant selected from the group of noble gas flourides and tetramethyl ammonium hydroxide. Xenon difluoride is the preferred gas phase etchant, but other flourides of xenon and of other noble gases could be equivalently substituted.

In the embodiment where the etching of the MEM device is performed with a gas phase xenon difluoride, the etching the MEM device is at ambient temperature without external heating, and is performed under a partial vacuum.

In an alternative embodiment the etching the MEM device is performed in a aqueous solution of tetramethyl ammonium hydroxide with silicic acid.

Somewhat more specifically the invention is a method for fabricating microelectromechanical (MEM) devices, using a standard integrated circuit (IC) process, comprised of the steps of providing a substantially completed MEM device except for the need of a single unmasked etch to complete the device, and etching the MEM device with xenon difluoride in a gas phase.

The invention is also a microelectromechanical (MEM) accelerometer defined in a semiconductor substrate comprising a proof mass fabricated on the substrate using integrated circuit processes. At least one and preferably two oxide beams couple the proof mass to the substrate. The oxide beam is at least in part unsupported and extending from the proof mass to the substrate. At least one polysilicon piezoresistor is disposed in the oxide beam. As a result, the MEM accelerometer is inexpensively manufactured using standard integrated circuit technology.

Preferably the accelerometer comprises at least two unsupported oxide beams coupling the proof mass to the substrate. Each of the oxide beams has at least one polysilicon piezoresistor disposed therein.

The invention also includes a method of making three dimensional structures using aluminum micro hinges. In one embodiment, the hinge is used to create accelerometers with sensitivity along orthogonal axes. The substrate is generally planar and the hinge is deformed so that the proof mass is oriented in a predetermined position out of the plane of the substrate. In one embodiment the accelerometer further comprises at least three of the proof masses fabricated from the substrate using integrated circuit processes and at one hinge. Each of the hinges couples a proof mass, support bean and peixoresistor to the substrate. At least one and possibly all three of the proof masses are oriented in a different plane relative to the substrate.

The hinges are comprised of aluminum. The hinges are fabricated using xenon difluoride as a gas-phase ambient temperature etchant to define the hinges apart from the substrate and proof mass. Alternatively, the hinges are fabricated using a tetramethyl ammonium hydroxide aqueous solution with silicic acid to define the hinges apart from the substrate and proof mass. Specifically, the proof mass, hinges, and polysilicon piezoresistor are formed using CMOS processes.

The invention is also an improvement in a method of mass fabricating a microelectromechanical device. The improvement comprises providing a device having portions which must be oriented to predetermined three dimensional positions in order assume a final configuration for said device, selected portions of said device having electrically isolated structures for receiving and holding charge for at least a temporary period. Selected amounts of electric charge are selectively deposited on said electrically isolated structures to generate electrostatic forces therebetween to move selected portions of said device to assume said final configuration according to well understood principles of mechanics and electrostatics specifically applied to each device topology. In the illustrated embodiment a scanning electron microscope is used to deposit electron charges on the electrically isolated structures.

The invention can still further be defined as an improvement in a microelectromechanical (MEM) device having a substrate and a movable part separate from the substrate comprising a derformable hinge coupling the substrate and part. The hinge is deformed so that the substrate and separate part form a three dimensional structure.

The improvement further comprises a sensing element for generating a position signal indicative of the spatial orientation of the part, such as a piezoresistor, capacitive, magnetic or electron tunneling device.

The improvement further comprises source of a force disposed on the substrate and part for deforming the hinge to form the three dimensional structure, such as a source of electrostatic charge, magnetic fields or thermally generated forces.

The improvement further comprises a circuit disposed either on the substrate, part or both, which circuit is coupled to the sensing element for processing the position signal, such as sensing, amplifying, filtering controlling or otherwise interfacing to the sensing element or an actuator.

In some embodiments the part is fabricated in a form or out of a substance so that it interacts with electromagnetic radiation, such as particle or x-ray radiation, visible, infrared, ultraviolet or other portions of the electromagnetic spectrum, to achieve a defined function.

The invention may be better visualized by now turning to the following drawings wherein like elements are referenced by like numerals.

BRIEF DESCRIPTION OF THE DRAWINGS

FIG. 6 is an idealized perspective view of an MEM three dimensional accelerometer.

FIG. 7 is an idealized diagram showing one etching system in which the etchant of the invention is used.

The invention as described in the context of the illustrated embodiment as well as various other embodiments can now be understood by turning to the following detailed description.

DETAILED DESCRIPTION OF THE PREFERRED EMBODIMENTS

What is described in the present specification are accelerometers using tiny proof masses and piezoresistive force detection. Conventional wisdom would indicate that this approach would not yield useful sensors. However, in fact, according to the invention, such devices are suitable in a wide range of applications.

In the illustrated embodiment, the accelerometers are fabricated using a standard CMOS foundry, such as 2 micron double poly, double metal p-well service, provided by Orbit Semiconductor from MOSIS service. When an additional etching step is performed on the chips after they are received from the CMOS fabricator to free the acceleration sensing element without harming the existing electronics on the chip. Using standard process and existing fabrication facilities, fabrication costs for tested chips is well below one dollar in comparison to currently existing accelerometers having a comparable performance, which accelerometers typically cost between 30 and 300 dollars.

Figure 1:
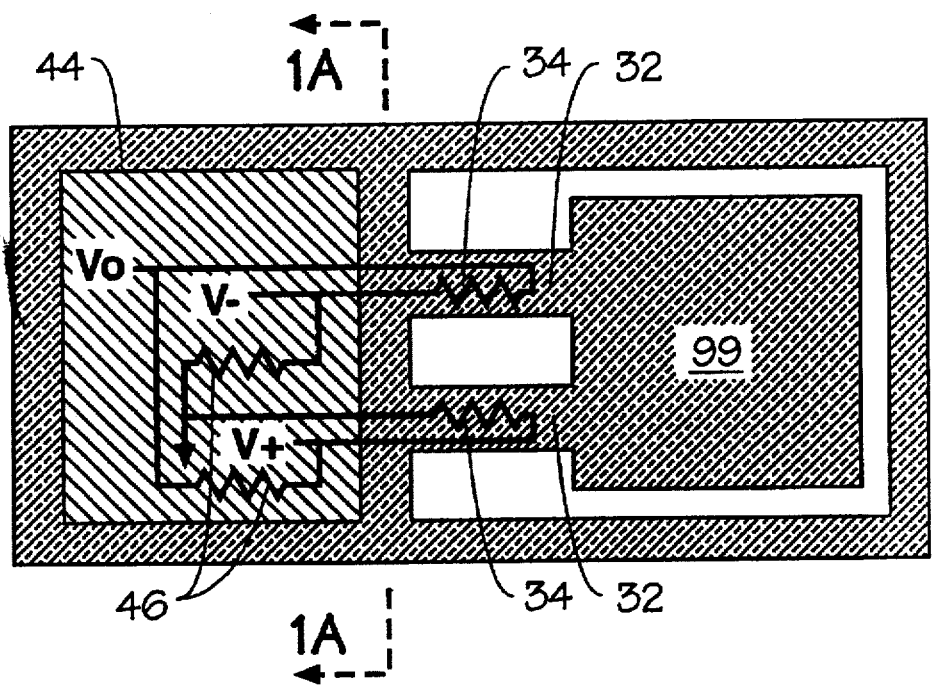
FIG. 1 is a simplified plan view of a first embodiment of a two beam accelerometer made according to the invention.
Figure 2:
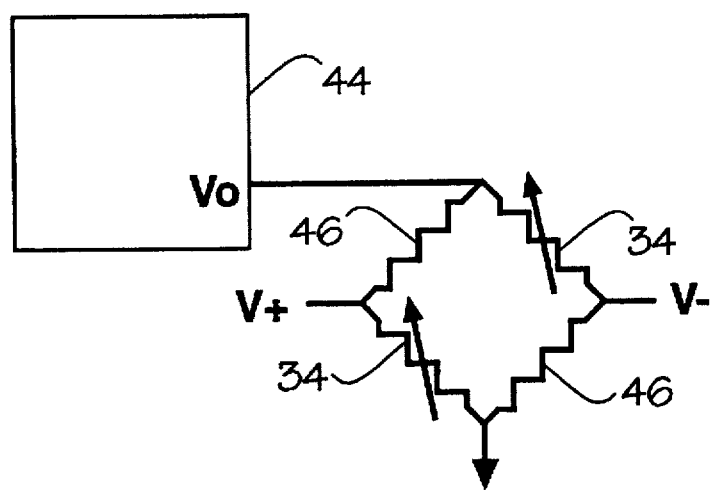
FIG. 2 is a schematic of the circuit for the accelerometer shown in FIG. 1.

A typically accelerometer is shown diagrammatically in FIG. 1 with piezoresistors 34 and each support beam 32. As shown in the schematic of FIG. 2, piezoresistors 34 typically perform two opposing arms of wheatstone bridge in combination with on chip resistors 46. The wheatstone bridge circuit typically provides low temperature sensitivity and good power supply rejection. The change in resistance is given by the product of the gauge factor of the piezoresistive polysilicon and the strain which the gauge experiences. The result is that the percentage change in output voltage for the wheatstone bridge is one-half the gauge factor times the strain in the gauges. In a simplified model, the strain at any point in the beam is given by the equation below where M is the bending moment which is being sensed, X is the position along the beam, z is the vertical distance from the center axis, E the modulas elasticity and I the moment inertia of a rectangular cross section.

$$\epsilon(x,z) = \frac{zM(x)}{EI}$$

An an n-type polysilicon piezoresistor has a gauge factor of roughly −20 with a p-type polysilicon piezoresistor having a gauge factor of between 20 and 30 depending upon grain size and doping. Polysilicon gauges are preferred because they are easy to protect during the sensor release etch. The polysilicon is protected by the surrounding oxides.

It would also be possible to use the p+ or n+ regions of a type which are typically used as a source drain of FET's for the piezoresistive sensing elements. The gauge factor of p+ single crystal silicon is much higher than that of polysilicon by a factor of about 5 depending upon the orientation of the sensor. In addition, the p+ region is further from the neutral axis of the beam, thereby giving additional sensitivity. To release the structure while preserving the p+ region, a dopant sensitive etchant such as EDP or TMAH must be used. Alternatively, an electrochemical etch stop could be used by biasing the p+ regions relative to the etchant solution during the etch.

Acceleration is turned into a bending moment which in turn is turned into a material strain, then a resistance change, and then finally a voltage change in the bridge. The resulting expression for the output voltage is given by the following equation where W is the width of the proof mass, $L_p$ the length of the proof mass, a the support beam thickness, B the support beam width and A is the acceleration.

$$\frac{V_{out}}{V_e} = \frac{3GzWL_p^2}{Ea^3b} A$$

Figure 1A:
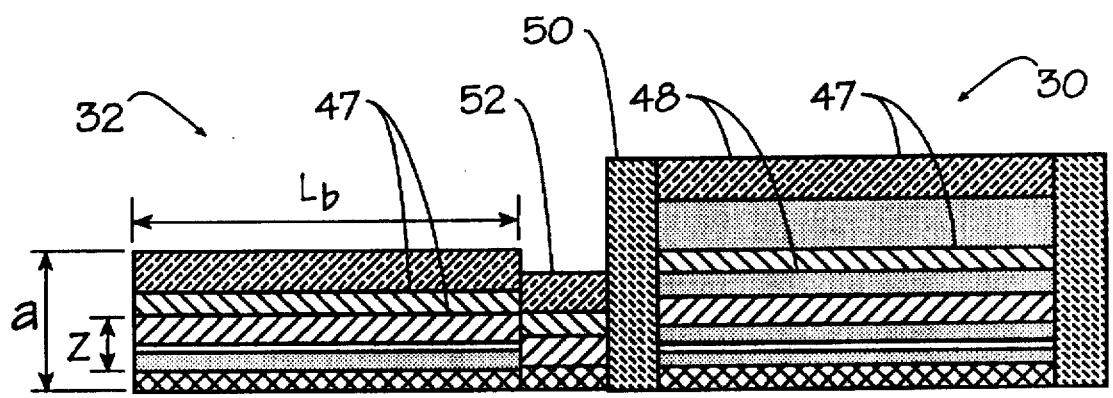
FIG. 1a is a longitudinal cross-sectional of the two beam accelerometer of FIG. 1.

FIG. 1a is a longitudinal cross sectional view taken through sectional lines 4a—4a of FIG. 1. Proof mass 30 is shown as being formed of a sandwich of alternating layers of glass or oxide 47 and metalization 48 and passivated by glass encapsulation 50. Proof mass 30 is coupled then through a glass and oxide connection 52 to the cantilever beam 32 which also in turn is made of a plurality of glass and oxide layers 47 in which a silicon piezoresistive element 34 has been embedded at a distance z off the center or neutral axis of beam 32.

Figure 3:
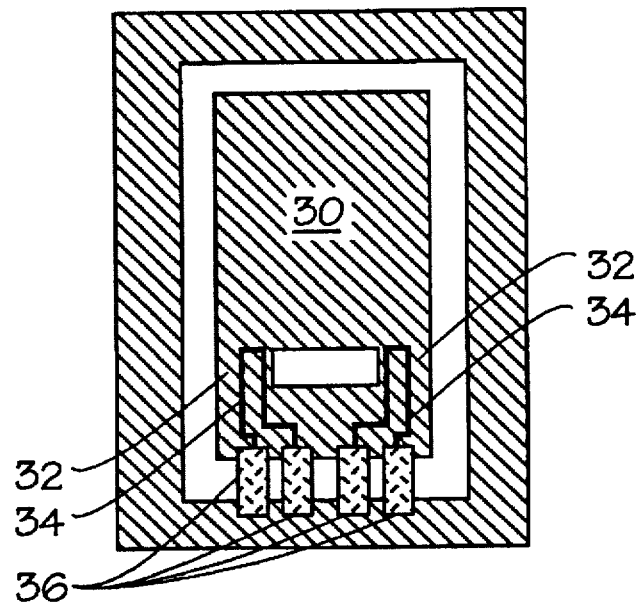
FIG. 3 is a simplified plan view of a second embodiment of a two beam accelerometer including aluminum hinges, made according to the invention.

FIGS. 1 and 3 show designs of two variations of an accelerometer. The basic design of each includes a proof mass 30 comprised of an oxide plate typically with etch holes and one or more support beams 32 into which polysilicon piezoresistors 34 have been disposed. Metal and poly layers can also be used to increase the mass of the proof plate. By adding a support plate and aluminum hinges 36, the design of FIG. 1 can be rotated out of the plane of the wafer as shown in the design of FIG. 3.

Figure 4:
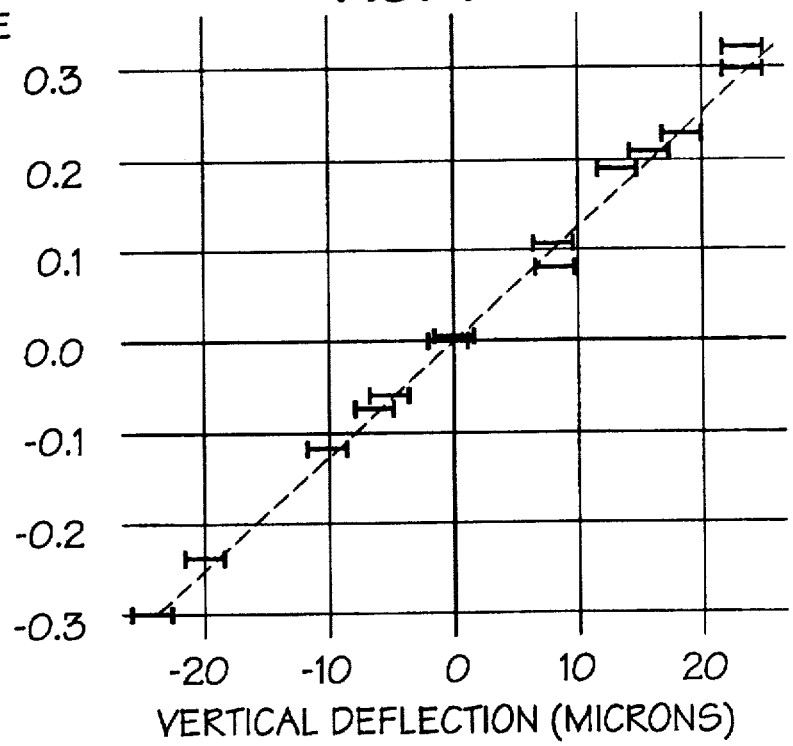
FIG. 4 is a graph of the percentage change in resistance of the polysilicon strain gauges as a function of the vertical displacement of the surface of the accelerometer of FIGS. 1 and 3.
Figure 5:
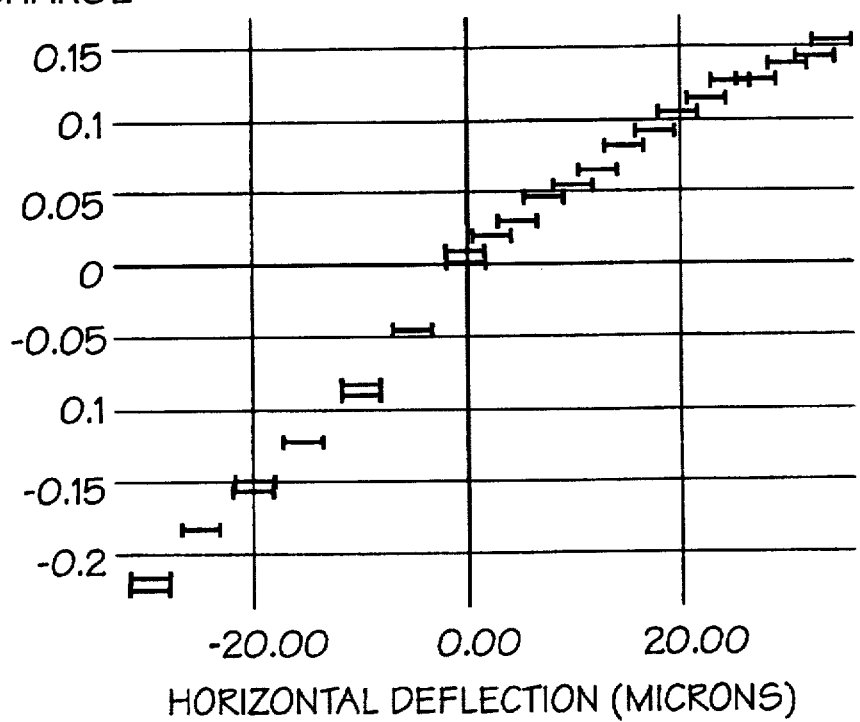
FIG. 5 is a graph of the percentage change in resistance of the polysilicon strain gauges as a function of the horizontal displacement of the surface of the accelerometer of FIG. 3 after rotation to a plane orthogonal to the substrate.

The resistance change of the piezoresistors 34 was measured as a function of the tip displacement of these devices. Micromanipulators were used to deflect the tip of the plate and deflection was visually measured using microscope focus for the vertical displacement. The resistance change versus vertical deflection is shown in FIG. 4 and the resistance change versus horizontal deflection for a rotated accelerometer is shown in FIG. 5.

In the embodiment of FIG. 3, electrical connection to the piezoresistor is measured through aluminum hinges 36. The resistance of the accelerometer strain gauges shown in FIGS. 1 and 3 as measured in FIGS. 4 and 5 was measured using a digital volt meter connected to a wire-wrapped amplifier board built with a gain of 1,000 and a bandwidth of DC to 10 Hertz. Using a wheatstone bridge configuration with a half bridge on chip, the external amplifier showed a 20 millivolt change when the accelerometer was rolled over from +1 g to −1 g. The 10 millivolt per g output signal corresponds to the deflection in the tens of nanometers per g.

Polysilicon strain gauges were characterized using several different beam and plate geometries. An n-type gauge factor, G, was found to vary between −10 and −20 over several tested runs.

FIG. 6 diagrammatically shows an integrated circuit wafer and substrate in which three accelerometers generally denoted by reference numerals 38a–c are coupled via aluminum hinges 40a–c to an integrated circuit wafer 42 into which an on chip amplifier 44 and other signal conditioning circuitry has been formed. The circuitry of chip 44 may also include CMOS amplifiers, filters, analog-to-digital converters, temperature compensation circuitry, calibration circuitry, and digital processing circuitry of any type desired. The three axis version of the accelerometer design uses one planar accelerometer and two orthogonal hinged accelerometers, each with an integrated low noise CMOS amplifier 44. Each proof mass 30 is composed of a stack of all oxides and conductors for a total mass of 2.5 micrograms. The support hinges 40a–c extend to form or are coupled to a beam which contains a 1 kilo-ohm polysilicon piezoresistor 34. The total area of the three axis system was 4 square millimeters. Substantially better performance is expected to be realized with an integrated CMOS amplifier than an off chip amplified accelerometer.

With no external loading, the structures shown in FIG. 6 could stand on their own held in place by aluminum hinges 40a–c. A micromanipulator or other external force is used to bend the hinges into the desired position. Rotated structures such as shown in FIG. 6 can be made with interlocking braces to keep the structure in the desired position by technique similar to those used with polysilicon structures as described by Pister, "Hinged Polysilicon Structures with Integrated Thin Film Transistors," in Proc. IEEE Solid State Sensor and Actuator Workshop, Hiltonhead, S.C., Jun. 22–25, 1992, at 136–39. Mass assembly of a device as shown in FIG. 6 can be achieved with the assistance of scanning electron microscopes. A beam of high energy electrons are used to deposit a specific amount of charge on an electrically isolated structure to electrostatically bend the hinges so that the structure assumes the final configuration.

A wide variety of sensors and actuators have previously been demonstrated using simple post-processing of standard CMOS technology. According to the invention, it is also now possible to assemble simple three-dimensional structures and integral piezoresistive deflection for sensors. Additionally, a simple new gas-phase approach to CMOS process etching can be used to fabricate the micromachined structures. With this extensive set of microelectromechanical elements, coupled with a tremendous library of electrical capabilities available in CMOS technologies, it is possible to design and fabricate sophisticated systems in a wide variety of applications with very rapid turnaround time.

The hinged piezoresistive three-dimensional sensor or accelerometer of the illustrated embodiment can find applications immediately in many devices including but not limited to a profilometer, an anemometer, magnetometer, hygrometer, electron tunneling sensors, and in cases where sensitivity is high enough in gyroscopic equipment. Other applications where such devices can be anticipated as having immediate application automotive crash sensing where requirements of 1 kHz bandwidth and +/−50 g range sensitivity is needed and disk drive shock sensing, in smart packages and in sporting equipment.

A new system has been developed which etches silicon highly selectively at moderate temperatures and without hydrodynamic forces potentially damaging to small structures and features. The system is based on the use of the gas phase etchant xenon diflouride, which is an unremarkable white solid at standard temperature and pressure.

Aluminum hinges and polysilicon piezoresistors have been fabricated using a standard commercial CMOS process with one maskless post-processing step. The hinges and piezoresistors have been formed using the metal interconnect and transistor gate layers with CMOS processes. Surface machining with xenon diflouride ($XeF_2$) is a simple and effective alternative to standard bulk etchings for this process because of its extreme selectivity and gentle gas-phase etch. Xenon diflouride has been synthesized since the early 1960's and is commercially available.

The use of xenon difluoride is different from the prior art in three major ways. The most significant of which is the highly selective nature of the etch. Semiconductor processing requires a great deal of etching done with as much selectivity and control as possible to produce useful patterns and structures. Xenon diflouride etches silicon preferentially over almost all tested materials which one could encounter in semiconductor processing.

The second highly distinct feature of xenon diflouride is the gas phase nature of the etch. Gas phase etching allows for very gentle processing with no hydrodynamic forces. This gentle processing allows for the construction of thin oxide and metal structures by established processes which would otherwise be totally inaccessible using liquid phase etchants. Hydrodynamic forces in the liquid phase could damage even the grossest of such structures or at least many of the structures described here.

Lastly the process is run without externally input heat. Although there may be some slight heat output from the actual etching itself the fact that the processing is done in a low temperature environment allows for silicon etching masked by uncured photoresist or other low temperature materials.

The problem which prompted development of this technique was the fabrication of micromechanical structures with integrated electronics. No other currently available technique allows for the use of standard CMOS to build satisfactory micromechanical structures with integrated electronics.

This technique was originally conceived as a way to selectively etch silicon from standard CMOS technology chips to create microelectromechanical devices. In order to do this we needed a highly selective, but minimally damaging system for etching silicon. Xenon diflouride had previously been used to etch the silicon away from the back side of an aluminum-silicon dioxide interface.

The illustrated embodiment is shown in the context of a piezoresistive accelerometer, but it is to be specifically understood that any type of MEM device could be made consistent with the teachings of the invention.

When the chips return from the foundry, they require a single unmasked etch for finishing prior to die separation. The traditional EDP etch is useful for etching pits in structures with dimensions on the order of 100 microns, but for longer etches, the aluminum metalization in the bonding pads is destroyed. Hydrazene monohydrate has been proposed as a more selective etchant but the health hazards of this material are substantially worse than EDP, which itself is a fairly toxic substance.

According to the invention xenon difluoride and tetramethyl ammonium hydroxide have been developed as extremely effective etchants for MEMS applications. One apparatus 10 for using the etchant is shown in FIG. 7 where a chamber 12 connected by a valve 16 to a source 18 of xenon diflouride. Gas or nitrogen purging is also provided to chamber 12 through valve 20. Once chamber 12, with samples inside, has been pumped down to a moderate vacuum by pump 14, valve 16 is opened and small amounts of xenon diflouride vaporize in the low pressure and enter the vessel. The etch is performed in vapor phase at room temperature with no external energy sources at a partial pressure of 1–4 Torr. Under these conditions, etch rates as high as 10 microns per minute have been observed with 1 to 3 microns per minute being typical. The etch is isotropic and independent of silicon doping compounds as well as highly selective.

This system has been used to etch a number of CMOS chips containing MOSFETs and other circuit elements, all of which were unaffected. Not only are aluminum and oxide proof against this etch, and thus candidates for masking, but photoresist and other polymer coatings also work as well. Unfortunately the gas phase etchant does attack chromium so certain forms of stainless steel must be avoided in the design of chamber 12. Inconel, monel, and other such alloys designed for use in fluorine based etching systems may be used, however, and no problems have been encountered from a system designed using components derived from commercial reactive ion etching systems.

In addition to its highly selective and CMOS compatible nature this etching system introduces no hydrodynamic forces. It has been used by us to release microscopic mechanical structures hooked directly into accompanying electronics. The gentle nature of this etching system allows the researchers to etch silicon out from underneath silicon dioxide or metal hinges only a few microns wide and hundreds of microns long. This technique of etching allows for the construction of complicated micromechanical structures directly integrated on chip with analog and digital electronics; all at relatively low cost as the CMOS technological infrastructure is well established.

The extreme selectivity of xenon difluoride to silicon dioxide and silicon nitride has previously been known. D. E. Ibbotson et al., "*Comparison of Xenon Difluoride in F-Atom Reactions with Silicon and Silicon Dioxide,*" Appl. Physics Phys. Lett. 44(12):1129–31 (1984), and H. F. Winters et al., "*The Etching of Silicon with Xenon Difluoride Vapor,*" Applied Physics Letters 34(1): 70–3 (1979). For example, 40 nanometer gate oxide is sufficient to protect the polysilicon gate from underside etch. We have also shown that xenon difluoride is extremely selectively to aluminum and photoresist. Simple mask test structure is made from 50 nanometer thick aluminum have been successfully released. A single layer of hard baked photoresist makes excellent etched mask. Chips bonded in standard ceramic chip carriers have been etched and tested successfully.

Figure 8:
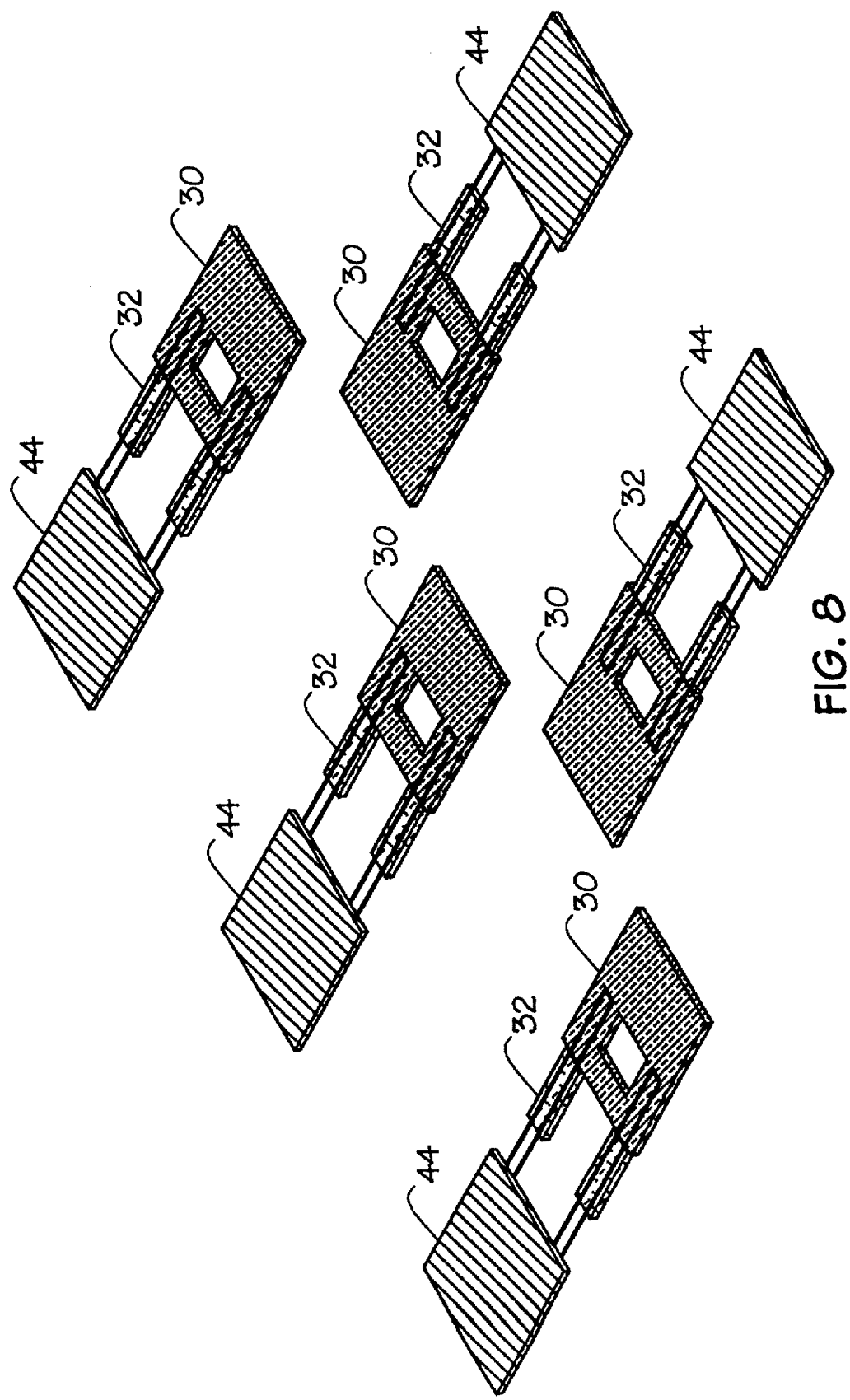
FIG. 8 is an enlarged view of a plurality of plates supported by aluminum hinges made according to the invention.

Silicon doping of tetramethyl ammonia hydroxide (TMAH) solutions have also been demonstrated as a method for improving the selectivity of TMAH to aluminum, C U Schnakenberg et al, "*TMAH W Etchants for Silicon Micromachining,*" in Proc. 6th Int. Conf. on Solid State Sensors and Actuators (Transducers '91) San Francisco, June 1991 at 815–18. By adding silicic acid directly, we have seen similar results. Cantilevered or end structure such as shown in FIG. 8 have been produced using an etch solution of 80 milliliters of 25 percent TMAH, 16 grams of silicic acid, and balanced deionized water in a 250 milliliter beaker. The chip was etched at 70 degrees for 24 hours, with the resulting etch depth of between 50 to 100 microns varying upon the surface pattern.

As can be seen from FIG. 8, the etch is nearly isotropic. The primary difference between structures etched in liquid TMAH silicic acid solutions and structures etched in gas-phase xenon difluoride is the drying induced bending of the support beams.

Consider for example the use of the disclosed etchants for the fabrication of an aluminum hinge and a polysilicon strain gauge. The aluminum hinge acts as a plastically deformable flexural hinge similar in function to the polyimide hinges described by Suzuki et al., "*Creation of an Insect Base Microrobot with an External Skeleton and Elastic Joints,*" in Proc. IEEE Microelectronic Mechanical Systems Workshop, Travemunde, Germany, Feb. 4–7, 1992 at 190–95. The hinge is created by running a line of metal over bare silicon. The strain gauge is comprised of a polysilicon resistor protected from the etchant by surrounding oxides. A typical CMOS process will have an additional layer of metal and polysilicon not shown in FIG. 9 which is a simplified cross section of aluminum trace 22 running between oxide plates 24 and a contacting polysilicon piezoresistor 26.

Figure 9:
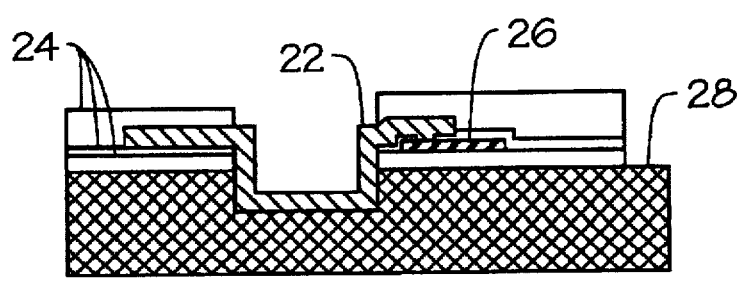
FIG. 9 is a side cross-sectional view of an aluminum hinge running between oxide plates and a polysilicon piezoresistor.

The oxide and first metal over-etch into silicon substrate 28 causes aluminum trace 22 to be lower than oxides 24. In a two or more metal process, all of the metal layers can be used to make hinges, separately or in combination. Similarly, much of the silicon substrate in the open areas is removed by the over-etch of the oxide and metal layers, resulting in metal traces which are recessed into the substrate after fabrication as shown in FIG. 9.

Once the structure has been etched, the oxide plates and aluminum hinges will be suspended over silicon pits. The multilayer structures are generally surprisingly flat, considering the heterogeneity of the thin films. Strain gradient induced deflections are typically less than 10 microns for cantilevers with lengths less than 300 microns. On a recent run, however, the tip deflection of a 300-micron oxide cantilever was over 100 microns. Generally, this excessive curvature is undesirable.

The resistance of loops of aluminum as shown in FIG. 8 is between 1 and 2 ohms before and after the etch. Aluminum can be deformed elastically over small range of motion and thereafter deforms plastically. Hinges are rotated using mechanical probes and can be rotated well past 90 degrees. The resistance of the plastically deformed aluminum lines also remains constant at between 1 to 2 ohms even after several deformations. Aluminum lines fail at current densities above 10 microamps per square micron before and after the etch.

An accelerometer is comprised of a proof mass and a force detection system. Existing silicon micromachined accelerometers are typically made from custom bulk micromachining processes which are designed to yield proof masses in the order of magnitude of milligrams. High performance accelerometers are typically either used for capacity of position sensing or force feedback sensing. Virtually all accelerometers use off-chip electronics to detect a condition the measured electrical signal.

The etchants of the invention, and in particular, xenon difluoride are particularly advantageous when used to fabricate microelectromechanical devices using a polymer layer. Traditionally it has been difficult to integrate polymer layers into MEMS processes because of the tendancy of bulk and surface etchants to destroy the polymers. Because of the extreme selectivity of xenon difluoride, uses of many if not most of these polymers should now be possible.

It should now be readily appreciated that the advantages of the invention is that surface micromachining techniques instead of bulk techniques can be used, that piezoresistive sensing instead of capacitive sensing will be possible, that integrated circuits instead of off-chip electronics can be integrally fabricated with the sensing device, and that the entire device can be made from standard CMOS or equivalently substitutable technologies instead of requiring a customized fabrication technique or processes.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. In a method for fabricating a microelectromechanical (MEM) device, said MEM device being formed in or on at least one semiconductor substrate, including an integrated circuit formed therein by standard IC processing and including a microelectromechanical assembly, an improvement comprising:

providing a substantially completed MEM device through said standard IC processing, said MEM device being completely fabricated except for at least one etching step, said etching step defining a structural element within said microelectromechanical assembly from said at least one substrate to complete said device and to render said MEM device operable; and etching said MEM device with a noble gas fluoride to define said structural element with respect to said substrate.

2. The improvement of claim 1 wherein etching said MEM device is performed with a gas phase xenon difluoride.

3. The improvement of claim 2 wherein etching said MEM device is at ambient temperature without external heating.

4. The improvement of claim 3 wherein etching said MEM device is performed under a partial vacuum.

5. The improvement of claim 1 wherein etching said MEM device is performed in a aqueous solution of tetramethyl ammonium hydroxide with silicic acid.

6. In a method for fabricating a microelectromechanical (MEM) device, said MEM device being formed in or on at least one semiconductor substrate, including an integrated circuit formed therein by standard IC processing and including a microelectromechanical assembly, an improvement comprising:

providing a substantially completed MEM device, said device being substantially completely fabricated except for a single etching step, said etching step defining a structural element within said microelectromechanical assembly from said at least one substrate to complete said device and to render said MEM device operable; and etching said MEM device with xenon difluoride in a gas phase to define said structural element from said substrate.

7. A microelectromechanical (MEM) accelerometer sensor defined in a semiconductor substrate comprising:

a proof mass fabricated in or on said substrate using integrated circuit processes;

at least one beam coupling said proof mass to said substrate, said beam being at least in part unsupported and extending from said proof mass to said substrate; and at least one polysilicon piezoresistor disposed in said beam, a pair of leads coupled to said piezoresistor to provide means for electrically coupling to said piezoresistor.

8. The accelerometer sensor of claim 7 further comprising at least two unsupported beams coupling said proof mass to said substrate, each of said beams having at least one polysilicon piezoresistor disposed therein.

9. The accelerometer sensor of claim 7 wherein said substrate is generally planar and further comprising a hinge which is deformed so that said proof mass is oriented in a predetermined position out of the plane of said substrate.

10. The accelerometer sensor of claim 9 further comprising:

at least three of said proof masses fabricated from said substrate using integrated circuit processes;

at least three hinges, each of said hinges coupling one of said three proof masses to said substrate, at least three beams coupled to corresponding ones of said three hinges, each of said beams being at least in part unsupported and extending from said proof mass to said substrate; and at least three polysilicon piezoresistors, one of three polysilicon piezoresistors being disposed in each of said three beams, wherein said proof masses are each oriented in a different plane relative to said substrate so that a three-axis accelerometer is provided.

11. The accelerometer sensor of claim 7 wherein said hinges are comprised of aluminum.

12. The accelerometer sensor of claim 11 wherein said beams are fabricated using xenon difluoride as a gas-phase ambient temperature etchant to define said beams apart from said substrate and proof mass.

13. The accelerometer sensor of claim 11 wherein said beams are fabricated using a tetramethyl ammonium hydroxide aqueous solution with silicic acid to define said beams apart from said substrate and proof mass.

14. The accelerometer sensor of claim 7 wherein said proof mass and polysilicon piezoresistor are formed using CMOS processes.

15. The accelerometer sensor of claim 14 wherein said beams are fabricated using xenon difluoride as a gas-phase ambient temperature etchant to define said beams apart from said substrate and proof mass.

16. The accelerometer sensor of claim 14 wherein said beam is defined and separated from said substrate through use of solution of tetramethyl ammonium hydroxide in silicic acid.

17. The accelerometer sensor of claim 9 wherein said proof mass, hinge and polysilicon piezoresistor are formed using CMOS processes.

18. In a method for fabricating a microelectromechanical (MEM) device, said MEM device being formed in or on at least one semiconductor substrate, including an integrated circuit formed therein by standard IC processing and including a microelectromechanical assembly, an improvement comprising:

providing a substantially completed MEM device, said device being substantially completely fabricated except for a single etching step, said etching step defining a structural element within said microelectromechanical assembly from said at least one substrate to complete said device and to render said MEM device operable; and etching said MEM device with an etchant selected from the group of xenon difluoride and an aqueous solution of tetramethyl ammonium hydroxide and silicic acid to define said structural element with respect to said substrate.

19. In a method for fabricating a microelectromechanical (MEM) device, said MEM device being formed in or on at least one semiconductor substrate, including an integrated circuit formed therein by standard IC processing and including a microelectromechanical assembly, an improvement comprising:

providing a substantially completed MEM CMOS device, said device being substantially completely fabricated except for at least one etching step, said etching step defining a structural element within said microelectromechanical assembly from said at least one substrate to complete said device and to render said MEM device operable; and etching said MEM CMOS device with a noble gas fluoride to define said structural element with respect to said substrate.

20. The improvement of claim 19 wherein said substantially completed MEM CMOS device is an accelerometer having an integrated circuit substrate, a proof mass and a piezoresistive sensing element coupling said substrate to said proof mass, but remaining undefined from them, wherein said etching defines said sensing element by a single etch step by said generally isotropic etchant.

21. In a method for mass fabrication of microelectromechanical devices, an improvement comprising:

providing a multiplicity of devices each having portions which must be oriented to predetermined three dimensional positions in order assume a final configuration for each said device, selected portions of each said device having an electrically isolated structure for receiving and holding charge for at least a temporary period; and selectively disposing selected amounts of electric charge on said selected portions of each said device to generate mutually repulsive or attractive electrostatic forces between said selected portions to move said selected portions of each said device to said final configuration.

22. The improvement of claim 21 where selectively depositing selected amounts of electric charge on said electrically isolated structures is performed by selective control of a scanning electron microscope which is directed to deposit electron charges on said electrically isolated structures.

23. An improvement in a microelectromechanical (MEM) device having a substrate and a movable part separate from said substrate formed as part of said microelectromechanical (MEM) device, said improvement comprising a conductive and permanently deformable hinge coupling said substrate and said movable part to allow permanent spatial reconfiguration of said movable part with respect to said substrate.

24. The improvement of claim 23 wherein said hinge is deformed so that said substrate and separate part form a three dimensional structure.

25. The improvement of claim 24 further comprising a sensing means for generating a position signal indicative of the spatial orientation of said part.

26. The improvement of claim 24 further comprising force means disposed on said substrate and part for deforming said hinge to form said three dimensional structure.

27. The improvement of claim 25 further comprising circuit means disposed on said substrate or part and coupled to said sensing means for processing said position signal.

28. The improvement of claim 23 wherein said part is interacts with electromagnetic radiation.

29. A method for fabricating a microelectromechanical (MEM) device on or in at least one substrate by removing mechanical constraints disposed between and connecting at least two components of said microelectromechanical (MEM) device after said at least two components have been formed, said mechanical restraints being removed by vapor phase etching said microelectromechanical (MEM) device in a noble gas fluoride.

30. The method of claim 29 wherein said vapor phase etching is performed using $XeF_2$.

31. The method of claim 30 further comprising vapor phase etching said microelectromechanical (MEM) device using an inter-halogen fluoride gas in place of etching with a noble gas fluoride.

32. The method of claim 29 in which at least one of said components is a thin film or thick film component and removing mechanical constraints comprises releasing said component from said at least one substrate by vapor phase etching of said substrate.

33. The method of claim 29 in which at least one of said components is a thin film or thick film component and removing mechanical constraints comprises releasing said component from said at least one substrate by vapor phase etching of said thin or thick film component.

34. The method of claim 29 in which said components comprise at least two thin film or thick film components and removing mechanical constraints comprises releasing said components by vapor phase etching one of said at least two thin or thick film components.

35. The method of claim 29 in which at least one of said components is comprised of insulating material and removing mechanical constraints between at least two components of said microelectromechanical (MEM) device by vapor phase etching in noble gas fluoride releases said insulating material.

36. The method of claim 35 in which at least one of said components is comprised of insulating material selected from the group of silicon dioxide, silicon nitride, photoresist, or other polymers and removing mechanical constraints between at least two components of said microelectromechanical (MEM) device by vapor phase etching in noble gas fluoride releases said insulating material selected from the group of silicon dioxide, silicon nitride, photoresist, or other polymers.

37. The method of claim 29 in which at least one of said components is comprised of a conductor and removing mechanical constraints between at least two components of said microelectromechanical (MEM) device by vapor phase etching in noble gas fluoride releases said conductor.

38. The method of claim 29 in which at least one of said components is comprised of a conductor selected from the group of gold and aluminum and removing mechanical constraints between at least two components of said microelectromechanical (MEM) device by vapor phase etching in noble gas fluoride releases said conductor selected from the group of gold and aluminum.

39. The method of claim 29 in which at least one of said components is comprised of a semiconductor and removing mechanical constraints between at least two components of said microelectromechanical (MEM) device by vapor phase etching in noble gas fluoride releases said semiconductor.

40. The method of claim 29 in which said components are comprised of a combination of two or more of the layers chosen from the categories of insulators, conductors, or semiconductors and removing mechanical constraints between at least two components of said microelectromechanical (MEM) device by vapor phase etching in noble gas fluoride releases said combination.

41. The method of claim 29 wherein said vapor phase etching has a rate which is modified by the application of electrical or thermal bias.

42. The method of claim 29 in which at least one of said substrates has a composition selected from the group of silicon, glass, quartz, pyrex, and plastic and removing mechanical constraints between at least two components of said microelectromechanical (MEM) device is by vapor phase etching in noble gas fluoride said substrate.

43. The method of claim 42 in which said substrate contains integrated circuitry and removing mechanical constraints between at least two components of said microelectromechanical (MEM) device is by vapor phase etching in noble gas fluoride without affecting said integrated circuitry.

44. The method of claim 42 in which said substrate contains integrated circuitry fabricated by standard IC processing techniques and removing mechanical constraints between at least two components of said microelectromechanical (MEM) device is by vapor phase etching in noble gas fluoride without affecting said integrated circuitry fabricated by standard IC processing techniques.

45. The method according to claim 44 in which said vapor phase release etching is performed with no further masking.

46. The method of claim 29 further comprising plastically deforming at least one of said components in order to rotate at least one of said components relative to another one of said components.

47. The method of claim 46 wherein plastically deforming at least one of said components plastically deforms an aluminum component.

48. The method of claim 46 wherein plastically deforming at least one of said components rotates a sensing component.

49. The method of claim 48 wherein said sensing elements are rotated relative to each other and/or the substrate in order to sense more than one axis of a given field such as acceleration, light, magnetic flux, rotation.

* * * * *

UNITED STATES PATENT AND TRADEMARK OFFICE
Certiicate

Patent No. 5,726,480

Patented: March 10, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Kristofer S. J. Pister, Orinda, California; and Ezekiel Kruglick, Berkeley, California.

Signed and Sealed this Twenty-Eighth Day of November, 2000.

MAHSHID D. SAADATC
*Supervisory Patent Examiner*
Art Unit 2815